(12) United States Patent
Noguchi et al.

(10) Patent No.: US 11,662,019 B1
(45) Date of Patent: May 30, 2023

(54) HYDRAULIC CONTROL APPARATUS

(71) Applicant: Honda Motor Co., Ltd., Tokyo (JP)

(72) Inventors: Tomoyuki Noguchi, Tokyo (JP);
Shunsuke Yoshida, Raymond, OH (US); Yuki Ono, Tokyo (JP); Nobuyuki Watanabe, Tokyo (JP); Kotaro Hiramine, Tokyo (JP); Yasunobu Tandai, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/902,862

(22) Filed: Sep. 4, 2022

(51) Int. Cl.
*F16H 61/12* (2010.01)

(52) U.S. Cl.
CPC ..... *F16H 61/12* (2013.01); *F16H 2061/1208* (2013.01); *F16H 2061/1236* (2013.01); *F16H 2061/1252* (2013.01)

(58) Field of Classification Search
CPC ............. F16H 61/12; F16H 2061/1208; F16H 2061/1236; F16H 2061/1252
See application file for complete search history.

(56) References Cited

U.S. PATENT DOCUMENTS

| | | | |
|---|---|---|---|
| 2008/0227595 A1* | 9/2008 | Pfister | F16H 63/3483 477/48 |
| 2011/0056317 A1* | 3/2011 | Sato | F16H 61/12 74/473.11 |
| 2018/0283419 A1* | 10/2018 | Tachibanada | F16D 41/125 |

FOREIGN PATENT DOCUMENTS

JP 6405402 B1 10/2018

\* cited by examiner

*Primary Examiner* — Edwin A Young
(74) *Attorney, Agent, or Firm* — Duft & Bornsen, PC

(57) ABSTRACT

A hydraulic control apparatus including a first and second control valves switched to exert hydraulic pressure on a piston to press toward first position, a third and fourth control valves switched to exert hydraulic pressure on the piston to press toward second position and, a CPU. The CPU performs executing a first process controlling the control valves so that hydraulic pressure is exerted by switching of the first, second and third control valves or a second process controlling the control valves so that hydraulic pressure is exerted by switching of the second control valve and determining that the first control valve is failed when movement of the piston to the first position is not detected through the first process and determining that the third control valve is failed when movement of the piston to the first position is not detected through the second process.

10 Claims, 8 Drawing Sheets

LOCKED STATE

UNLOCKED STATE

*FIG. 4*

|      | C1 | C2 | C3 | B1 | B2 | B3 | TWC |
|------|----|----|----|----|----|----|-----|
| RVS  |    |    | ○  |    | ○  |    | ○   |
| LOW  |    |    |    | ○  | ○  |    |     |
| 2nd  |    | ○  |    | ○  | ○  |    |     |
| 3rd  |    |    | ○  | ○  | ○  |    |     |
| 4th  |    | ○  | ○  | ○  |    |    |     |
| 5th  | ○  |    | ○  | ○  |    |    |     |
| 6th  | ○  | ○  | ○  |    |    |    |     |
| 7th  | ○  |    | ○  |    | ○  |    |     |
| 8th  | ○  | ○  |    |    | ○  |    |     |
| 9th  | ○  |    |    |    | ○  | ○  |     |
| 10th | ○  | ○  |    |    |    | ○  |     |

TWO-TO-ONE MODE

ONE-TO-ZERO MODE

ONE-TO-TWO MODE

HYDRAULIC CONTROL APPARATUS

BACKGROUND OF THE INVENTION

Field of the Invention

This invention relates to a hydraulic control apparatus having a function for detecting a failure.

Description of the Related Art

Conventionally, as an apparatus of this type, there is a known apparatus that controls hydraulic pressure acting on a piston provided for operating an automatic transmission of a vehicle. Such an apparatus is described, for example, in Japanese Examined Patent Publication No. 6405402 (JP6405402B). The apparatus according to JP6405402B includes first and second control valves for exerting hydraulic pressure on the piston to switch the piston to a first state and third and fourth control valves for exerting hydraulic pressure on the piston to switch the piston to a second state. Then, in order to switch the piston from the second state to the first state, it is determined that at least one of the first to fourth control valves is failed when the piston is not switched to the first state despite the hydraulic pressure exerted on the piston by switching the first to third control valves.

However, in the apparatus described in JP6405402B, it is not possible to determine which of the first to fourth control valves is failed.

SUMMARY OF THE INVENTION

An aspect of the present invention is a hydraulic control apparatus including: a piston provided so as to be movable between a first position and a second position; a plurality of control valves including a first control valve, a second control valve, a third control valve and a fourth control valve, the first control valve and the second control valve being respectively switched so as to exert a first hydraulic pressure and a second hydraulic pressure on the piston to press the piston toward the first position, the third control valve and the fourth control valve being respectively switched so as to exert a third hydraulic pressure and a fourth hydraulic pressure on the piston to press the piston toward the second position; a first failure detection device that detects a failure of the second control valve; a second failure detection device that detects a failure of the fourth control valve; a movement detection device that detects a movement of the piston from the second position to the first position; and an electronic control unit including a microprocessor and a memory connected to the microprocessor. The microprocessor is configured to perform controlling the plurality of control valves, the controlling including executing a first process controlling the plurality of control valves so that the first hydraulic pressure, the second hydraulic pressure and the third hydraulic pressure are exerted on the piston while the fourth hydraulic pressure is not exerted, or a second process controlling the plurality of control valves so that the second hydraulic pressure is exerted on the piston while the first hydraulic pressure, the third hydraulic pressure and the fourth hydraulic pressure are not exerted, when the piston is moved from the second position to the first position. The microprocessor is further configured to perform determining that the first control valve is failed when the movement of the piston to the first position is not detected by the movement detection device in spite of an execution of the first process, and determining that the third control valve is failed when the movement of the piston to the first position is not detected by the movement detection device in spite of an execution of the second process, under a situation where the failure of the second control valve is not detected by the first failure detection device and the failure of the fourth control valve is not detected by the second failure detection device.

Another aspect of the present invention is a hydraulic control method controlling a hydraulic device, the hydraulic device including a piston provided so as to be movable between a first position and a second position, and a plurality of control valves including a first control valve, a second control valve, a third control valve and a fourth control valve, the first control valve and the second control valve being respectively switched so as to exert a first hydraulic pressure and a second hydraulic pressure on the piston to press the piston toward the first position, the third control valve and the fourth control valve being respectively switched so as to exert a third hydraulic pressure and a fourth hydraulic pressure on the piston to press the piston toward the second position. The hydraulic control method includes: detecting a failure of the second control valve; detecting a failure of the fourth control valve; detecting a movement of the piston from the second position to the first position; executing a first process controlling the plurality of control valves so that the first hydraulic pressure, the second hydraulic pressure and the third hydraulic pressure are exerted on the piston while the fourth hydraulic pressure is not exerted, or a second process controlling the plurality of control valves so that the second hydraulic pressure is exerted on the piston while the first hydraulic pressure, the third hydraulic pressure and the fourth hydraulic pressure are not exerted, when the piston is moved from the second position to the first position; and determining that the first control valve is failed when the movement of the piston to the first position is not detected in spite of an execution of the first process, and determining that the third control valve is failed when the movement of the piston to the first position is not detected in spite of an execution of the second process, under a situation where the failure of the second control valve is not detected and the failure of the fourth control valve is not detected.

BRIEF DESCRIPTION OF THE DRAWINGS

The objects, features, and advantages of the present invention will become clearer from the following description of embodiments in relation to the attached drawings, in which:

FIG. 4 is a diagram illustrating, in a tabular format, engagement states of clutch mechanisms, brake mechanisms, and two-way clutch corresponding to speed stages of the transmission in FIG. 2;

DETAILED DESCRIPTION OF THE INVENTION

Figure 1:
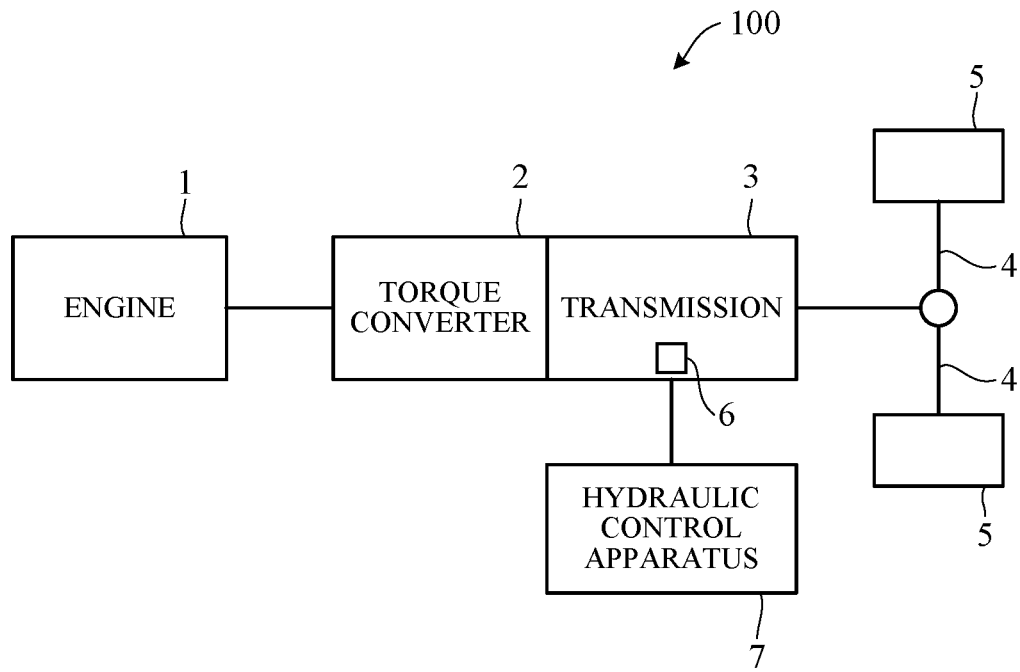
FIG. 1 is a diagram schematically illustrating a configuration of a traveling drive system of a vehicle including a hydraulic control apparatus according to an embodiment of the present invention.

Hereinafter, an embodiment of the present invention is explained with reference to FIGS. 1 to 10. A hydraulic control apparatus according to an embodiment of the present invention is applied to a hydraulic circuit for controlling a transmission of a vehicle. FIG. 1 is a diagram schematically illustrating a configuration of a traveling drive system of a vehicle 100 including a hydraulic control apparatus according to the present embodiment. As illustrated in FIG. 1, the vehicle 100 includes an engine 1, a torque converter 2, and a transmission 3.

The engine 1 is an internal combustion engine (e.g., a gasoline engine) in which intake air supplied through a throttle valve (not shown) and fuel injected from an injector (not shown) are mixed at an appropriate ratio, ignited by an ignition plug or the like, and combusted, thereby generating rotational power. Instead of the gasoline engine, various engines such as a diesel engine may be used. The opening degree of the throttle valve and the injection amount (injection timing, injection time) of the fuel from the injector are controlled by the ECU.

The torque output from the engine 1 is input to the torque converter 2. In the torque converter 2, the torque is amplified, and the torque output from the torque converter 2 is input to the transmission 3. The transmission 3 is provided in a power transmission path between the torque converter 2 and the axle 4, shifts the rotation input from the torque converter 2, and converts and outputs the torque input from the torque converter 2. The torque output from the transmission 3 is transmitted to the drive wheels 5 via the axle 4, and thereby the vehicle 100 travels. In addition to the engine 1, a traveling motor serving as a traveling drive source may be provided, and the vehicle 100 may be configured as a hybrid vehicle.

The transmission 3 is, for example, a stepped transmission in which the transmission ratio can be changed stepwise according to a plurality of transmission stages. A continuously variable transmission capable of continuously changing the transmission ratio can also be used as the transmission 3. The transmission 3 includes an engagement mechanism 6 such as a friction clutch. The hydraulic control apparatus 7 includes a plurality of control valves (a solenoid valve, a linear solenoid valve, and the like) operated by an electric signal, and the hydraulic control apparatus 7 controls the flow of oil to the engagement mechanism 6 in response to the operation of the control valves, so that the speed stage of the transmission 3 can be changed.

Figure 2:
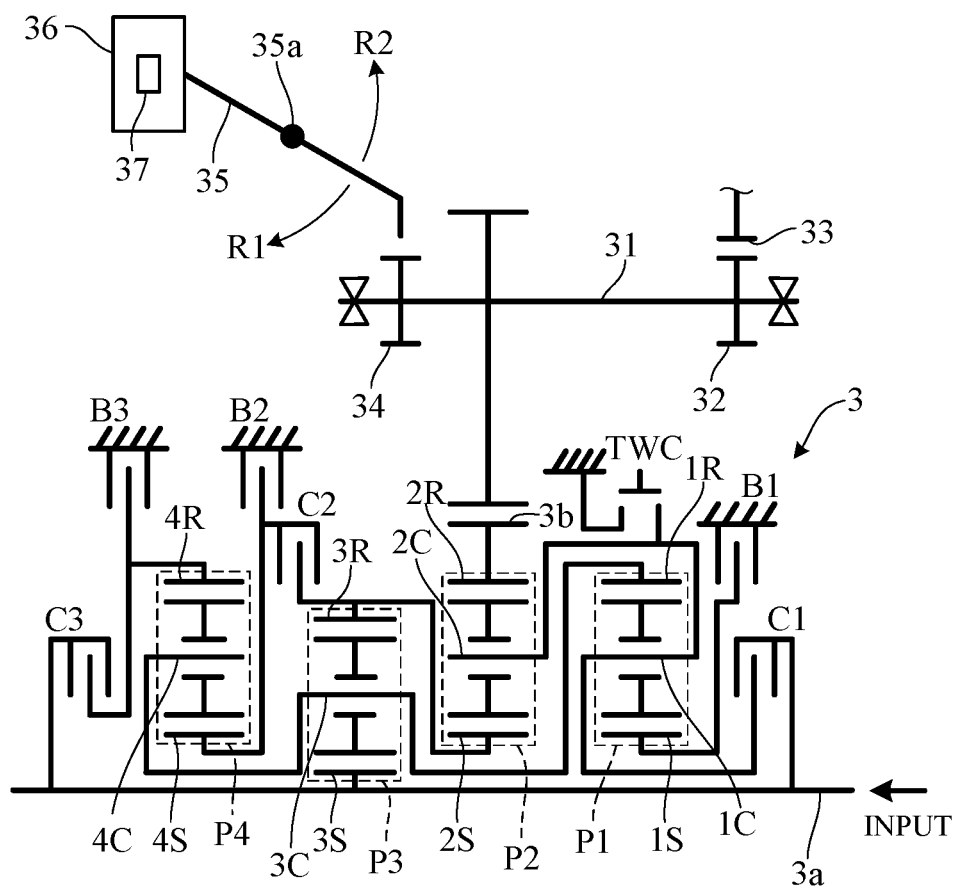
FIG. 2 is a skeleton diagram illustrating an example of a transmission in FIG. 1.

FIG. 2 is a skeleton diagram illustrating a specific example of the transmission 3. The transmission 3 shown in FIG. 2 is a stepped transmission with ten forward speeds and one reverse speed having a plurality of wet or dry clutch mechanisms C1 to C3 and brake mechanisms B1 to B3 as the engagement mechanism 6. In some cases, the torque converter 2 and the transmission 3 are collectively referred to as a transmission. The transmission 3 is housed in a transmission case fixed to the vehicle 100.

As illustrated in FIG. 2, the transmission 3 is an automatic transmission in which a speed stage is automatically switched according to a vehicle speed and a required driving force. The torque output from the torque converter 2 is input to the input shaft 3a, and thereby the input shaft 3a rotates. The rotation of the input shaft 3a is shifted by the transmission 3, and is transmitted to the idle shaft 31 via the output shaft 3b and the gear. The rotation of the idle shaft 31 is transmitted to the axle 4 (FIG. 1) via the gears 32 and 33, and thereby the vehicle 100 travels.

A parking gear 34 is fixed to the idle shaft 31 so as to be rotatable integrally with the idle shaft 31. A claw portion at the tip of the parking pole 35 is engageable with the parking gear 34. The parking pole 35 is swung in the R1 direction or the R2 direction by the drive unit 36 with the shaft portion 35a fixed to the transmission case as a fulcrum. A parking device is configured by the parking gear 34, the parking pole 35, and the drive unit 36. When the parking pole 35 swings in the R1 direction, the claw portion engages with the parking gear 34, and the rotation of the axle 4 via the idle shaft 31 is prevented (parking lock operation state).

When the parking pole 35 swings in the R2 direction, the claw portion is disengaged from the parking gear 34, and the rotation of the axle 4 via the idle shaft 31 is allowed (parking lock release state). Although detailed illustration is omitted, the drive unit 36 includes a parking mechanism 37 having a piston driven by hydraulic pressure, and the parking device is switched between the parking lock operation state and the parking lock release state in response to driving of the piston of the parking mechanism 37. The parking mechanism 37 is included in the hydraulic control apparatus 7 of FIG. 1.

The transmission 3 includes first to fourth planetary gear mechanisms P1 to P4, first to third clutch mechanisms C1 to C3, first to third brake mechanisms B1 to B3, and a two-way clutch TWC in a torque transmission path from the input shaft 3a to the output shaft 3b. The first to fourth planetary gear mechanisms P1 to P4 are all of single pinion type respectively having sun gears 1S to 4S, ring gears 1R to 4R, and carriers 1C to 4C.

The carrier 1C of the first planetary gear mechanism P1 is coupled to the carrier 2C of the second planetary gear mechanism P2, and both of them rotate integrally. The sun gear 2S of the second planetary gear mechanism P2 is connected to the ring gear 3R of the third planetary gear mechanism P3, and both of them rotate integrally. The ring gear 1R of the first planetary gear mechanism P1 is coupled to the carrier 3C of the third planetary gear mechanism P3 and is coupled to the carrier 4C of the fourth planetary gear mechanism P4, and these rotate integrally. The output shaft 3b is provided integrally with the ring gear 2R of the second planetary gear mechanism P2. The input shaft 3a is connected to the sun gear 3S of the third planetary gear mechanism P3, and both of them rotate integrally.

The first clutch mechanism C1 is provided so as to be able to engage and release the input shaft 3a and the carrier 1C of the first planetary gear mechanism P1. When the first clutch mechanism C1 is engaged, the input shaft 3a and the carrier 1C rotate integrally, and when the first clutch mechanism C1 is released, the carrier 1C is relatively rotatable with respect to the input shaft 3a.

The second clutch mechanism C2 is provided so as to be able to engage and release the ring gear 3R of the third planetary gear mechanism P3 and the sun gear 4S of the fourth planetary gear mechanism P4. When the second clutch mechanism C2 is engaged, the ring gear 3R and the sun gear 4S rotate integrally, and when the second clutch mechanism C2 is released, the sun gear 4S is relatively rotatable with respect to the ring gear 3R.

The third clutch mechanism C3 is provided so as to be able to engage and release the input shaft 3a and the ring gear 4R of the fourth planetary gear mechanism P4. When the third clutch mechanism C3 is engaged, the input shaft 3a and the ring gear 4R rotate integrally, and when the third clutch mechanism C3 is released, the ring gear 4R is relatively rotatable with respect to the input shaft 3a.

The first brake mechanism B1 is provided so that the sun gear 1S of the first planetary gear mechanism P1 can be engaged with and released from the transmission case. When the first brake mechanism B1 is engaged, the sun gear 1S becomes non-rotatable, and when the first brake mechanism B1 is released, the sun gear 1S becomes rotatable.

The second brake mechanism B2 is coupled to the second clutch mechanism C2, and is provided so that the sun gear 4S of the fourth planetary gear mechanism P4 can be engaged with and released from the transmission case. When the second brake mechanism B2 is engaged, the sun gear 4S becomes non-rotatable, and when the second brake mechanism B2 is released, the sun gear 4S becomes rotatable.

The third brake mechanism B3 is coupled to the third clutch mechanism C3, and is provided so that the ring gear 4R of the fourth planetary gear mechanism P4 can be engaged with and released from the transmission case. When the third brake mechanism B3 is engaged, the ring gear 4R becomes non-rotatable, and when the third brake mechanism B3 is released, the ring gear 4R becomes rotatable.

The first to third clutch mechanisms C1 to C3 and the first to third brake mechanisms B1 to B3 constitute the engagement mechanism 6 of FIG. 1, respectively, and engagement operations of them are controlled by the hydraulic control apparatus 7. More specifically, the clutch mechanisms C1 to C3 and the brake mechanisms B1 to B3 respectively have a pair of friction engagement elements that are rotatable relative to each other. The frictional engagement element is coupled to the piston, and the piston is pushed by hydraulic pressure, whereby the pair of frictional engagement elements abut and engage with each other. The hydraulic pressure acting on the piston is adjusted by operation of a control valve of the hydraulic control apparatus 7, so that the engagement force of the pair of frictional engagement elements of the respective engagement mechanisms C1 to C3, B1 to B3 can be adjusted. As a result, the pair of frictional engagement elements can be rotated while being slid relative to each other, and the clutch mechanisms C1 to C3 and the brake mechanisms B1 to B3 can be brought into a half-clutch state.

The two-way clutch TWC is switchable between a locked state and an unlocked state. The two-way clutch TWC, when switched to the locked state, prevents the carrier 1C of the first planetary gear mechanism P1 and the carrier 2C of the second planetary gear mechanism P2 from rotating, and when switched to the unlocked state, allows the carrier 1C and 2C to rotate in one direction. The configuration of the two-way clutch TWC is described in detail.

Figure 3A:
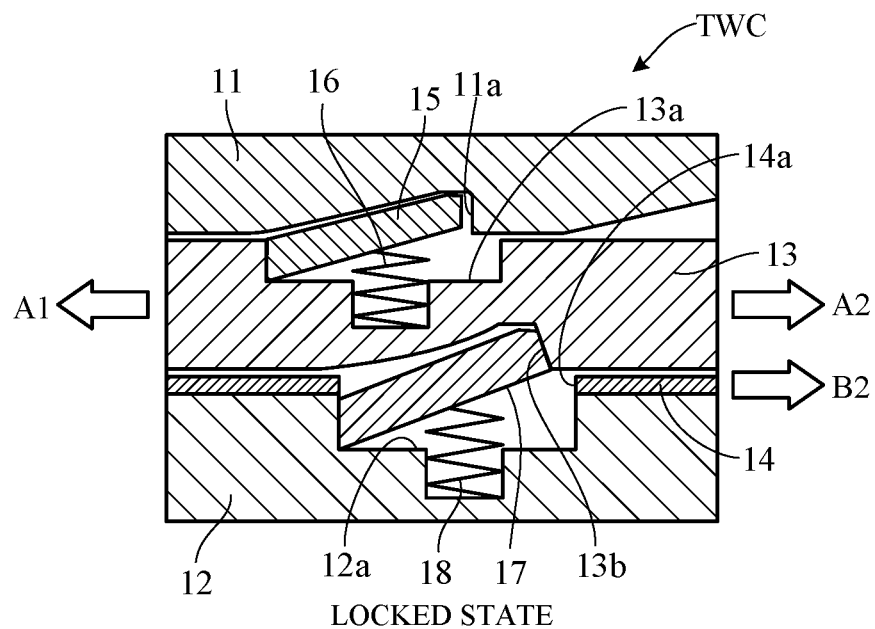
FIG. 3A is a cross-sectional view schematically showing a configuration of a two-way clutch included in the transmission of FIG. 2, and shows a locked state of the two-way clutch.
Figure 3B:
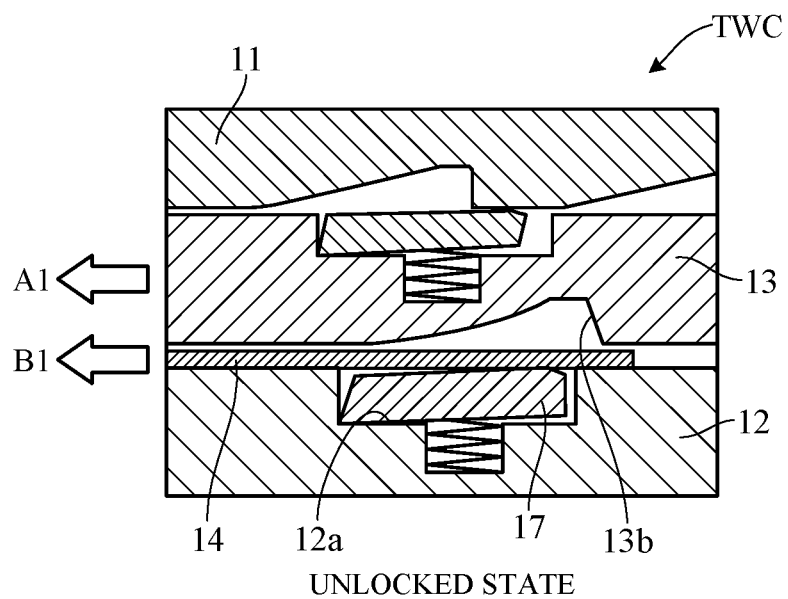
FIG. 3B is a cross-sectional view schematically showing the configuration of the two-way clutch included in the transmission of FIG. 2, and shows a unlocked state of the two-way clutch.

FIG. 3A and FIG. 3B are cross-sectional views schematically showing the configuration of the two-way clutch TWC. In particular, FIG. 3A shows the locked state of the two-way clutch TWC, and FIG. 3B shows the unlocked state. As shown in 3A, the two-way clutch TWC includes a pair of fixing members 11 and 12 fixed to the transmission case, a rotating body 13 rotatably interposed between the pair of fixing members 11 and 12, and a rotating plate 14 rotatably interposed between the rotating body 13 and the fixing member 12. The rotating body 13 is integrally provided with the carrier 1C of the first planetary gear mechanism P1 and the carrier 2C of the second planetary gear mechanism P2, and the carriers 1C and 2C are rotated by the rotation of the rotating body 13. The rotating body 13 and the rotating plate 14 are each formed in a ring shape and arranged concentrically with each other.

The rotating body 13 is provided with a recess 13a facing the fixing member 11, and a strut 15 is accommodated in the recess 13a. The strut 15 is rotatably supported by the rotating body 13 with one end as a fulcrum, and is constantly biased so as to project from the recess 13a toward the fixing member 11 by a spring 16 provided on the bottom surface side of the strut 15. The fixing member 11 is provided with an engaging portion 11a to which an end portion of the strut 15 is engaged. When the strut 15 is engaged with the engaging portion 11a, the rotation of the rotating body 13 in the direction of arrow A2 is prevented.

The fixing member 12 is provided with a recess 12a facing the rotating plate 14, and a strut 17 is accommodated in the recess 12a. The strut 17 is rotatably supported by the fixing member 12 with one end as a fulcrum, and is constantly biased so as to project from the recess 12a toward the rotating plate 14 by a spring 18 provided on the bottom surface side of the strut 17. The rotating plate 14 is provided with an opening 14a, and in FIG. 3A, the end of the strut 17 passes through the opening 14a and projects toward the rotating body 13. The rotating body 13 is provided with an engaging portion 13b in which an end portion of the strut 17 is engaged. When the strut 17 is engaged with the engaging portion 13b, the rotation of the rotating body 13 in the direction of arrow A1 is prevented. At this time, the rotations of the rotating body 13 in both directions of arrows A1 and A2 are prevented, and the two-way clutch TWC is in the locked state.

The rotating plate 14 is rotatable by a predetermined amount in the direction of arrow B2 from the state shown in FIG. 3A. When the rotating plate 14 rotates in the direction of arrow B2, the strut 17 is covered by the rotating plate 14 and accommodated in the recess 12a of the fixing member 12, as shown in 3B. As a result, the engagement between the strut 17 and the engaging portion 13b is released, and the rotating body 13 is rotatable in the direction of arrow A1 (the engine rotation direction). At this time, the rotation of the rotating body 13 in the direction of arrow A2 is prevented, and the two-way clutch TWC is in the unlocked state in which the rotation in only one direction is allowed. The rotating plate 14 is rotatable by a predetermined amount in the direction of arrow B1 from the state in FIG. 3B. When the rotating plate 14 rotates in the direction of arrow B1, the two-way clutch TWC is in the locked state of FIG. 3A.

A switching mechanism, which will be described later, is engaged with the rotating plate 14. More specifically, at the rotating plate 14, a convex portion (FIG. 5) is protruded radially outward from the outer peripheral surface of the rotating plate 14, and the switching mechanism is engaged with the convex portion. The switching mechanism constitutes a hydraulic switching mechanism having a piston driven by hydraulic pressure, and the rotating plate 14 rotates in the directions of arrows B1 and B2 in response to the driving of the piston. The switching mechanism is included in the hydraulic control apparatus 7 of FIG. 1.

Figure 6:
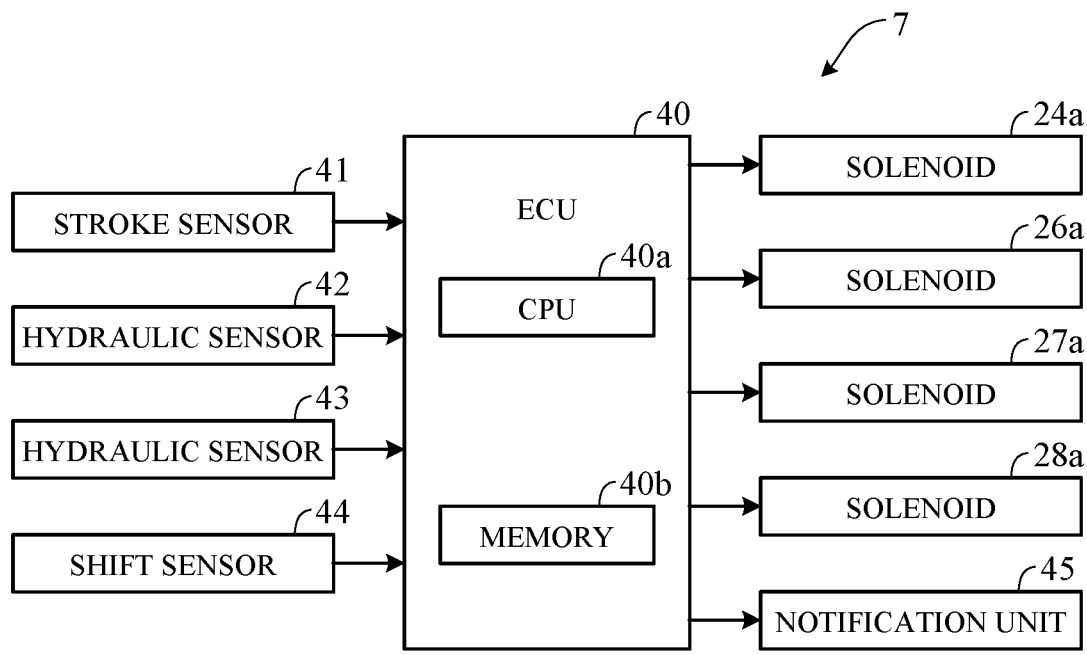
FIG. 6 is a block-diagram illustrating a control configuration of the hydraulic control apparatus according to the embodiment of the present invention.

Operations of the clutch mechanisms C1 to C3, the brake mechanisms B1 to B3, and the two-way clutch TWC are controlled by commands from the ECU (FIG. 6). The ECU determines a target speed stage according to a predetermined shift diagram based on the vehicle speed and the required driving force. Then, the ECU output control signal to the control valve of the hydraulic control apparatus 7 so that the speed stage of the transmission 3 becomes the target speed stage, switches the engagement and disengagement of the clutch mechanisms C1 to C3 and the brake mechanisms B1 to B3, and drives the piston of the switching mechanism to switch the two-way clutch TWC between the locked state and the unlocked state.

The transmission 3 is switched to any one of a parking range (P range), a reverse drive range (R range), a neutral range (N range), and a forward drive range (D range) according to a shift operation by a driver. More specifically, the vehicle includes a shift device of a shift-by-wire (SBW) type. The shift device includes a shifter provided in the driver's seat and having a plurality of pressing operation portions corresponding to respective ranges of P, R, N, D, and a shift command detector (shift sensor) that detects an operation of the shifter (pressing operation portion). The configuration of the shift device is not limited to this, and for example, the shifter may be constituted by a movable lever, and the shift sensor may be configured to detect the selection (shift command) of the shift range by the operation of the lever.

FIG. 4 is a diagram illustrating, in a tabular format, the engagement states of the clutch mechanisms C1 to C3, the brake mechanisms B1 to B3, and the two-way clutch TWC corresponding to speed stages of the transmission 3. In FIG. 4, symbol "o" indicates engaged state or locked state, and absence of a symbol (blank) indicates released state or unlocked state. As shown in FIG. 4, the two-way clutch TWC is locked during reverse travel (RVS) and unlocked during forward travel. During the reverse travel, the third clutch mechanism C3 and the second brake mechanism B2 are engaged and the others are released.

During the forward travel, in first speed stage (LOW), the first brake mechanism B1 and the second brake mechanism B2 are engaged, and the others are released. In second speed stage (2nd), the second clutch mechanism C2, the first brake mechanism B1, and the second brake mechanism B2 are engaged, and the others are released. In third speed stage (3rd), the third clutch mechanism C3, the first brake mechanism B1 and the second brake mechanism B2 are engaged, and the others are released. In fourth speed stage (4th), the second clutch mechanism C2, the third clutch mechanism C3, and the first brake mechanism B1 are engaged, and the others are released. In fifth speed stage (5th), the first clutch mechanism C1, the third clutch mechanism C3, and the first brake mechanism B1 are engaged, and the others are released. In sixth speed stage (6th), the first clutch mechanism C1, the second clutch mechanism C2, and the third clutch mechanism C3 are engaged, and the others are released. In seventh speed stage (7th), the first clutch mechanism C1, the third clutch mechanism C3, and the second brake mechanism B2 are engaged, and the others are released. In eighth speed stage (8th), the first clutch mechanism C1, the second clutch mechanism C2, and the second brake mechanism B2 are engaged, and the others are released. In ninth speed stage (9th), the first clutch mechanism C1, the second brake mechanism B2, and the third brake mechanism B3 are engaged, and the others are released. In tenth speed stage (10th), the first clutch mechanism C1, the second clutch mechanism C2, and the third brake mechanism B3 are engaged, and the others are released.

The above is the engagement operation of the clutch mechanisms C1 to C3 and the brake mechanisms B1 to B3 when switching to R range and D range is instructed by the shifter. Although not shown in the drawings, when switching to N range is instructed by the shifter, the engagement operations of the clutch mechanisms C1 to C3 and the brake mechanisms B1 to B3 are controlled so as to shut off the power transmission from the input shaft 3a to the output shaft 3b. When switching to P range is instructed, the engagement operations of the clutch mechanisms C1 to C3 and the brake mechanisms B1 to B3 are controlled in the same manner as N range or so that a predetermined speed stage is established.

Figure 5:
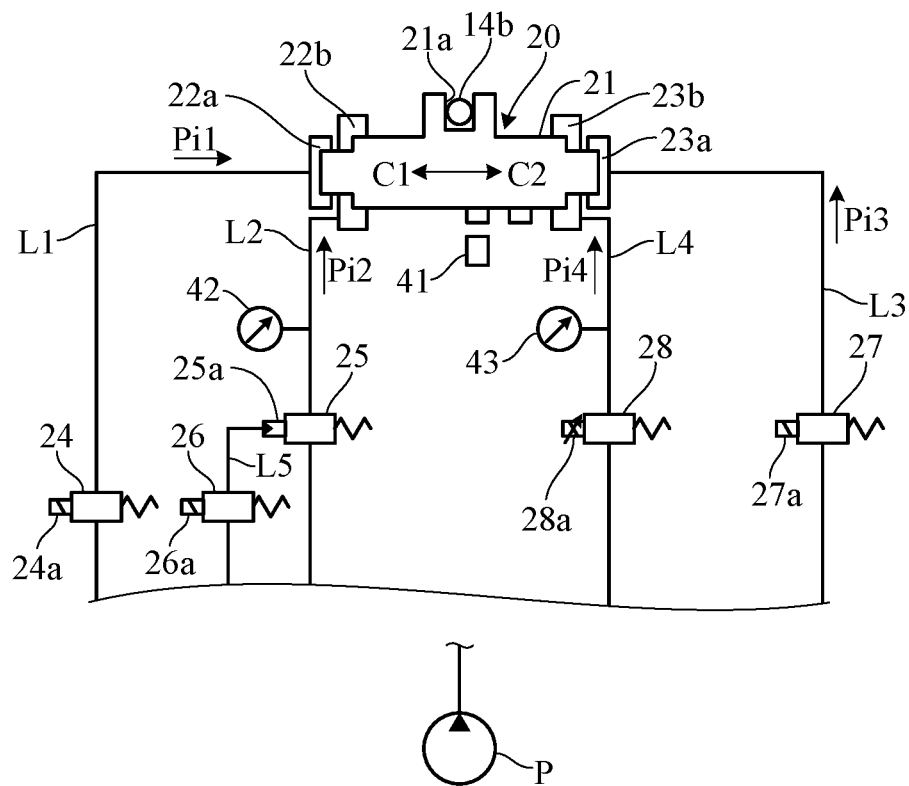
FIG. 5 is a diagram showing an example of a hydraulic circuit to which the hydraulic control apparatus according to the embodiment of the present invention is applied, and particularly shows a configuration of the hydraulic circuit around a switching mechanism.

A configuration of a main part of the hydraulic control apparatus 7 will be described. FIG. 5 is a diagram showing a part of the hydraulic circuit in the hydraulic control apparatus 7, and particularly shows a part of the driving of the switching mechanism 20 for switching the two-way clutch TWC by extracting the part. As shown in FIG. 5, the switching mechanism 20 includes a piston 21 movably disposed between a locked position and an unlocked position. A recessed portion 21a is provided on a surface of the piston 21, and a protruding portion 14b protruded radially outward from the outer peripheral surface of the rotating plate 14 (FIG. 3A) engages with the recessed portion 21a.

When the piston 21 moves in the direction of arrow C1, the position of the piston 21 becomes the locked position. As a result, the rotating plate 14 is driven in the direction of arrow B1 in FIG. 3B through the protruding portion 14b, and the two-way clutch TWC is in the locked state of FIG. 3A. On the other hand, when the piston 21 moves in the direction of arrow C2, the position of the piston 21 becomes the unlocked position. As a result, the rotating plate 14 is driven in the direction of arrow B2 in FIG. 3A through the protruding portion 14b, and the two-way clutch TWC is in the unlocked state of FIG. 3B.

Oil chambers 22a and 22b are provided on the end surface of the piston 21 on a side in the direction of arrow C1, and oil chambers 23a and 23b are provided on the end surface on a side in the direction of arrow C2. The hydraulic oil discharged from the hydraulic pump P can be guided to the oil chambers 22a, 22b, 23a, and 23b, respectively.

Specifically, a solenoid valve 24 is connected to the oil chamber 22a via an oil passage L1. The solenoid valve 24 is a normally open valve, and is closed when the solenoid 24a is energized, and is opened when the solenoid is demagnetized. When the solenoid valve 24 is opened, the pressure oil discharged from the hydraulic pump P is guided to the oil chamber 22a via the solenoid valve 24 and the oil passage L1. A hydraulic valve 25 is connected to the oil chamber 22b via an oil passage L2.

The hydraulic valve 25 is switchable between open position and closed position according to the pilot pressure acting on a pilot port 25a. That is, in a state where the pilot pressure is not exerted, the hydraulic valve 25 is switched to the closed position by biasing force of a spring. A solenoid valve 26 is connected to the pilot port 25a via an oil passage L5. The solenoid valve 26 is a normally closed valve, and is opened when the solenoid 26a is energized, and is closed when demagnetized. When the solenoid valve 26 is opened, the pressure oil discharged from the hydraulic pump P is guided to the pilot port 25a of the hydraulic valve 25, so that the pilot pressure is exerted on the pilot port 25a. Therefore, the hydraulic valve 25 is switched to the open position. As a result, the pressure oil discharged from the hydraulic pump P is guided to the oil chamber 22b via the hydraulic valve 25 and the oil passage L2.

A solenoid valve 27 is connected to the oil chamber 23a via an oil passage L3. The solenoid valve 27 is a normally closed valve, and is opened when the solenoid 27a is energized, and is closed when demagnetized. When the solenoid valve 27 is opened, the pressure oil discharged from the hydraulic pump P is guided to the oil chamber 23a via the solenoid valve 27 and the oil passage L3.

A linear solenoid valve 28 is connected to the oil chamber 23b via an oil passage L4. The linear solenoid valve 28 is a normally closed valve, and is opened when the solenoid 28a is energized, and is closed when demagnetized. The linear solenoid valve 28 has a pressure regulating function for regulating the hydraulic pressure, and when the linear solenoid valve 28 is opened, the pressure oil discharged from the hydraulic pump P is regulated by the linear solenoid valve 28 and then guided to the oil chamber 23b via the oil passage L4.

When the hydraulic oil is guided to the oil chambers 22a and 22b, a hydraulic pressure that presses the piston 21 in the direction of arrow C2 is exerted on one end face of the piston 21. When the hydraulic oil is guided to the oil chambers 23a and 23b, a hydraulic pressure that presses the piston 21 in the direction of arrow C1 is exerted on the other end face for the piston 21. In the present embodiment, so that the pressing force of the piston 21 in the direction of arrow C2 by the hydraulic pressure in the oil chamber 22a and the pressing force for the piston 21 in the direction of C2 by the hydraulic pressure in the oil chamber 22b are equal to each other, and the pressing force for the piston 21 in the direction of arrow C1 by the hydraulic pressure in the oil chamber 23a and the pressing force for the piston 21 in the direction of arrow C1 by the hydraulic pressure in the oil chamber 23b are equal to each other, and the total pressing force in the direction of arrow C2 by the hydraulic pressure in the oil chambers 22a and 22b and the total pressing force in the direction of arrow C1 by the hydraulic pressure in the oil chambers 23a and 23b are equal to each other, the pressure receiving area of both end surfaces of the piston 21 and the hydraulic pressure exerted through the oil passages L1, L2, L3 and L4 are set. For example, the switching mechanism 20 is configured such that the pressure receiving areas of the oil chambers 22a, 22b, 23a and 23b are equal to each other, and the hydraulic circuit is configured such that the hydraulic pressures exerted on the oil chambers 22a, 22b, 23a and 23b when the pressure oil is guided to the oil chambers 22a, 22b, 23a and 23b are equal to each other.

Therefore, when the hydraulic pressure is applied to each of the oil chambers 22a and 22b and the hydraulic pressure is applied to either one of the oil chambers 23a and 23b, and when the hydraulic pressure is applied to either one of the oil chambers 22a and 22b and the hydraulic pressure is not applied to any of the oil chambers 23a and 23b, the piston 21 moves in the direction of arrow C2. As a result, the two-way clutch TWC is unlocked. On the other hand, when the hydraulic pressure is applied to each of the oil chambers 23a and 23b, and the hydraulic pressure is applied to either one of the oil chambers 22a and 22b, and when the hydraulic pressure is applied to either one of the oil chambers 23a and 23b and the hydraulic pressure is not applied to any of the oil chambers 22a and 22b, the piston 21 moves in the direction of arrow C1. As a result, the two-way clutch TWC is locked.

In this manner, the hydraulic circuit for two-way clutch operation is configured to exert hydraulic pressure on one end face of the piston 21 via a pair of oil passages L1 and L2 independent of each other, and to exert hydraulic pressure on the other end face via a pair of oil passages L3 and L4 independent of each other. Accordingly, even in a case where a predetermined hydraulic pressure cannot be applied to any of the oil chambers 22a, 22b, 23a, and 23b due to failure (for example, fixation) of any of the plurality of valves 24 to 28, the piston 21 can be moved in a desired direction and redundancy can be enhanced.

Since the plurality of valves 24 to 28 regulate the flow of the hydraulic oil, these valves may be referred to as control valves. In FIG. 5, oil passages from the hydraulic pump P to the control valves 24 to 28 are omitted, but other control valves including hydraulic valves, relief valves, check valves, and the like may be provided in the oil passages.

Hereinafter, for convenience, the hydraulic pressure exerting on the oil chamber 22a of the switching mechanism 20 is defined as a first pilot pressure Pi1, the hydraulic pressure exerting on the oil chamber 22b is defined as a second pilot pressure Pi2, the hydraulic pressure exerting on the oil chamber 23a is defined as a third pilot pressure Pi3, and the hydraulic pressure exerting on the oil chamber 23b is defined as a fourth pilot pressure Pi4. The hydraulic control apparatus 7 includes a plurality of sensors. Specifically, the hydraulic control apparatus 7 includes a stroke sensor 41 for detecting the position of the piston 21, and the movement of the piston 21 to the locked position and the movement to the unlocked position are detected by the stroke sensor 41.

Further, a hydraulic sensor 42 is connected to the oil passage L2 between the hydraulic valve 25 and the oil chamber 22b, and the second pilot pressure Pi2 is detected by the hydraulic sensor 42. A hydraulic sensor 43 is connected to the oil passage L4 between the linear solenoid valve 28 and the oil chamber 23b, and the fourth pilot pressure Pi4 is detected by the hydraulic sensor 43. Each of the hydraulic sensors 42 and 43 is a sensor that outputs signal corresponding to the hydraulic pressure. At least one of the hydraulic sensors 42 and 43 (for example, the hydraulic sensor 42) may be configured as a sensor that outputs an ON signal when the hydraulic pressure is equal to or higher than a predetermined value, that is, a hydraulic switch.

In the hydraulic control apparatus 7 configured as described above, if the control valves 24 to 28 fail, the pilot pressures Pi1 to P4 may be abnormally outputted to the oil passages L1 to L4, and the normal operation of the switching mechanism 20 may be hindered. Therefore, it is necessary to detect failures of the control valves 24 to 28. In this regard, failures of the control valves 25 and 26 can be detected by the hydraulic sensor 42, and a failure of the control valve 28 can be detected by the hydraulic sensor 43. If hydraulic sensors are connected to the oil passages L1 and L3, failures of the control valves 24 and 27 can also be detected by the hydraulic sensors.

However, in the configuration in which the failures of all the control valves 24 to 28 are detected by the hydraulic sensors, the number of the sensors increases and the cost increases. Therefore, the present embodiment configures the hydraulic control apparatus 7 as follows so that the failed control valves can be satisfactorily identified while suppressing an increase in cost.

FIG. 6 is a block diagram illustrating a control configuration of the hydraulic control apparatus 7 according to the present embodiment. As shown in FIG. 6, the hydraulic control apparatus 7 includes an electronic control unit (ECU) 40, a stroke sensor 41 connected to ECU40, hydraulic sensors 42 and 43, a shift sensor 44, solenoids 24a, 26a to 28a of the solenoid valves 24, 26, and 27 and the linear solenoid valve 28, and a notification unit 45.

The shift sensor 44 detects a range switching instruction of the transmission 3 by the operation of the shifter. The notification unit 45 is a device that notifies the driver of information, and includes a monitor and a speaker. The ECU 40 includes a computer including a CPU (microprocessor) 40a, a memory 40b such as a ROM, RAM, and other peripheral circuits (not shown) such as an input/output interface.

When an instruction for switching to R range is detected by the shift sensor 44, the ECU 40 moves the piston 21 to the locked position and switches the two-way clutch TWC to the locked state. In this state, when an instruction for switching to D range is detected by the shift sensor 44, the ECU 40 moves the piston 21 to the unlocked position and switches the two-way clutch TWC to the unlocked state. Here, in order to move the piston 21 from the locked position to the unlocked position, the total oil pressure acting on the oil chambers 22a and 22b side needs to be larger than the total oil pressure acting on the oil chambers 23a and 23b side. This can be achieved, for example, in two ways, as shown in FIG. 7A and FIG. 7B.

Figure 7A:
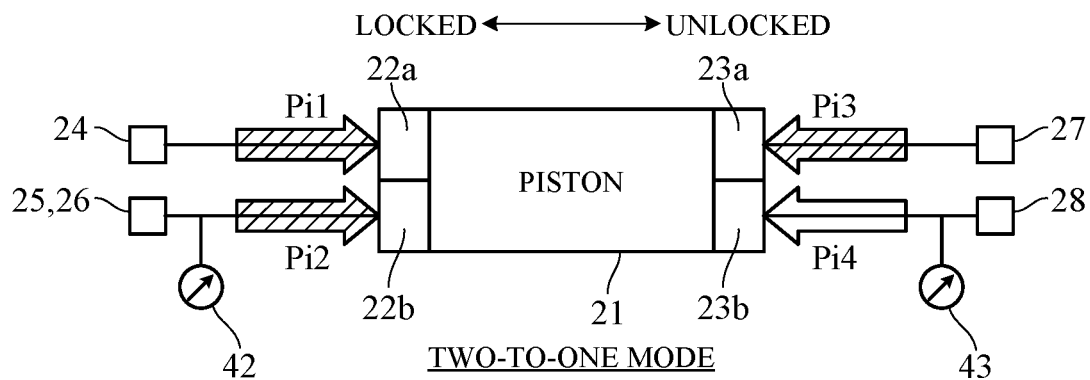
FIG. 7A is a diagram showing an example of switching operation of the switching mechanism in FIG. 5.
Figure 7B:
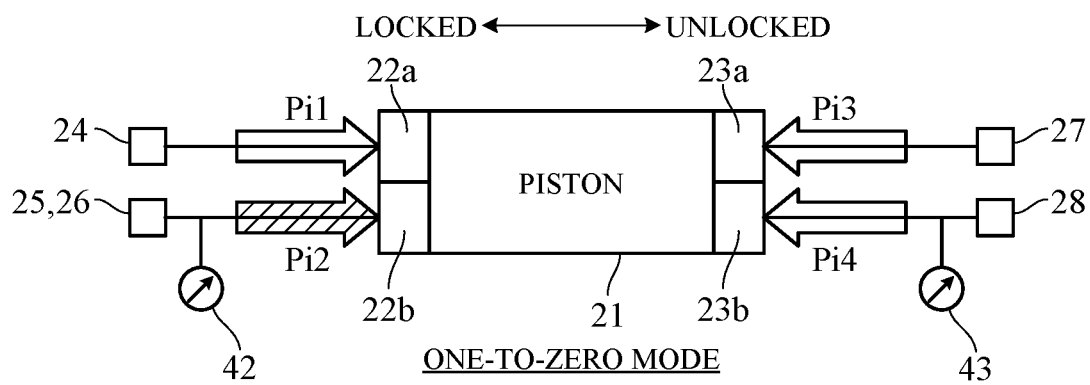
FIG. 7B is a diagram showing another example of switching operation of the switching mechanism in FIG. 5.

FIG. 7A is a diagram schematically illustrating an mode in which two pilot pressures (a first pilot pressure Pi1 and a second pilot pressure Pi2) act on the oil chambers 22a and 22b side and only one pilot pressure (a third pilot pressure Pi3) acts on the oil chambers 23a and 23b side. The mode in FIG. 7A is referred to as a two-to-one mode for convenience. FIG. 7B is a diagram schematically illustrating another mode in which only one pilot pressure (second pilot pressure Pi2) acts on the oil chambers 22a and 22b side and no pilot pressure acts on the oil chambers 23a and 23b side. The mode in FIG. 7B is referred to as a one-to-zero mode for convenience. In FIGS. 7A and 7B, the conditions in which pilot pressures are acting, are indicated by hatched arrows.

As shown in FIG. 7A, in a state where the ECU 40 is outputting control signal to the solenoids 24a, 26a to 28a so as to realize two-to-one mode, when the movement of the piston 21 to the unlocked position is detected by the stroke sensor 41, there is a possibility that any of the control valves 24 to 28 has failed. At this time, when it is detected by the hydraulic sensor 42 that the predetermined second pilot pressure Pi2 is acting on the piston 21, the ECU 40 determines that the control valves 25 and 26 are normal. Further, when it is detected by the hydraulic sensor 43 that fourth pilot pressure Pi4 is not acting on the piston 21, the ECU 40 determines that the control valve 28 is normal.

In this condition, if third pilot pressure Pi3 does not act on the piston 21 due to the failure of the control valve 27, the piston 21 should switch to the unlocked position regardless of whether or not first pilot pressure Pi1 acts on the piston 21. However, since the switching of the piston 21 to the unlocked position is not detected in FIG. 7A, the ECU 40 determines that third pilot pressure Pi3 acts on the piston 21 and first pilot pressure Pi1 does not act. Thus, the ECU 40 detects a failure of the control valve 24. When the failure of the control valve 24 is detected, the ECU 40 realizes two-to-zero mode in which two pilot pressures (first pilot pressure Pi1 and second pilot pressure Pi2) act on the oil chambers 22a and 22b side and third pilot pressure Pi3 and fourth pilot pressure Pi4 do not act on the oil chambers 23a and 23b side, in order to move the piston 21 to the unlocked position. However, since first pilot pressure Pi1 does not act due to the failure of the control valve 24, it is actually one-to-zero mode in which only the second pilot pressure Pi2 acts. Accordingly, even when first pilot pressure Pi1 does not act on the oil chamber 22a due to the failure of the control valve 24, the piston 21 can be moved to the unlocked position and the two-way clutch TWC can be switched to the unlocked condition, thereby increasing redundancy.

As shown in FIG. 7B, in a state where the ECU 40 is outputting control signal to the solenoids 24a, 26a to 28a so as to realize one-to-zero mode, when the movement of the piston 21 to the unlocked position is detected by the stroke sensor 41, there is a possibility that any one of the control valves 24 to 28 has failed. At this time, when it is detected by the hydraulic sensor 42 that the predetermined second pilot pressure Pi2 is acting on the piston 21, the ECU 40 determines that the control valves 25 and 26 are normal. Further, when it is detected by the hydraulic sensor 43 that fourth pilot pressure Pi4 is not acting on the piston 21, the ECU 40 determines that the control valve 28 is normal.

In this condition, if first pilot pressure Pi1 acts on the piston 21 due to the failure of the control valve 24, the piston 21 should switch to the unlocked position regardless of whether or not third pilot pressure Pi3 acts on the piston 21. However, since the switching of the piston 21 to the unlocked position is not detected in FIG. 7B, the ECU 40 determines that first pilot pressure Pi1 does not act on the piston 21 and third pilot pressure Pi3 acts on the piston. Thus, the ECU 40 detects a failure of the control valve 27.

When the failure of the control valve 27 is detected, the ECU 40 realizes two-to-zero mode in which two pilot pressures (first pilot pressure Pi1 and second pilot pressure Pi2) act on the oil chambers 22a and 22b side and third pilot pressure Pi3 and fourth pilot pressure Pi4 do not act on the oil chambers 23a and 23b side, in order to move the piston 21 to the unlocked position. However, since third pilot pressure Pi3 acts due to the failure of the control valve 27, it is actually two-to-one mode. Accordingly, even when third pilot pressure Pi3 acts on the oil chamber 23a due to the failure of the control valve 27, the piston 21 can be moved to the unlocked position and the two-way clutch TWC can be switched to the unlocked condition, thereby increasing redundancy.

When the failures of the control valves 24 and 27 are detected as described above, the ECU 40 outputs control signal to the notification unit 45 so as to notify the failure of the control valves 24 and 27. Thus, for example, the failure information is displayed on the monitor of the driver's seat, and the driver can recognize the failures of the control valves 24 and 27. As the failure information, the driver may be notified that the hydraulic device for switching the shift range to D range has failed.

Figure 7C:
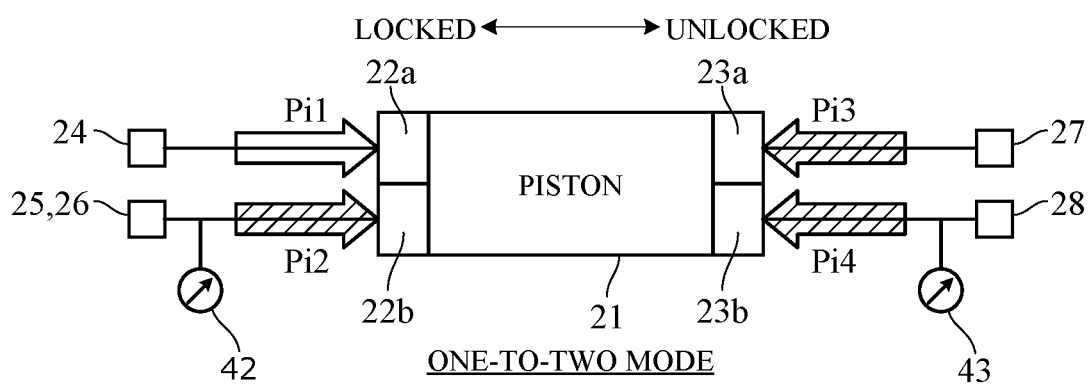
FIG. 7C is a diagram showing further other example of switching operation of the switching mechanism in FIG. 5.

In the state that the piston 21 is moved to the unlocked position, when the switching instruction to R range is detected by the shift sensor 44, the ECU 40 outputs control signal to the solenoids 24a and 26a to 28a so as to realize one-to-two mode. FIG. 7C is a diagram schematically illustrating an example of one-to-two mode. As shown in 7C, in one-to-two mode, only one pilot pressure (second pilot pressure Pi2) acts on the oil chambers 22a and 22b side, and two pilot pressures (third pilot pressure Pi3 and fourth pilot pressure Pi4) act on the oil chambers 23a and 23b side. Accordingly, the piston 21 can be moved to the locked position, and the two-way clutch TWC can be switched to the locked state. When the movement of the piston 21 to the locked position is not detected by the stroke sensor 41 when one-to-two mode is realized, the two-way clutch TWC may be switched to the locked state by implementing of zero-to-two mode.

Figure 8:
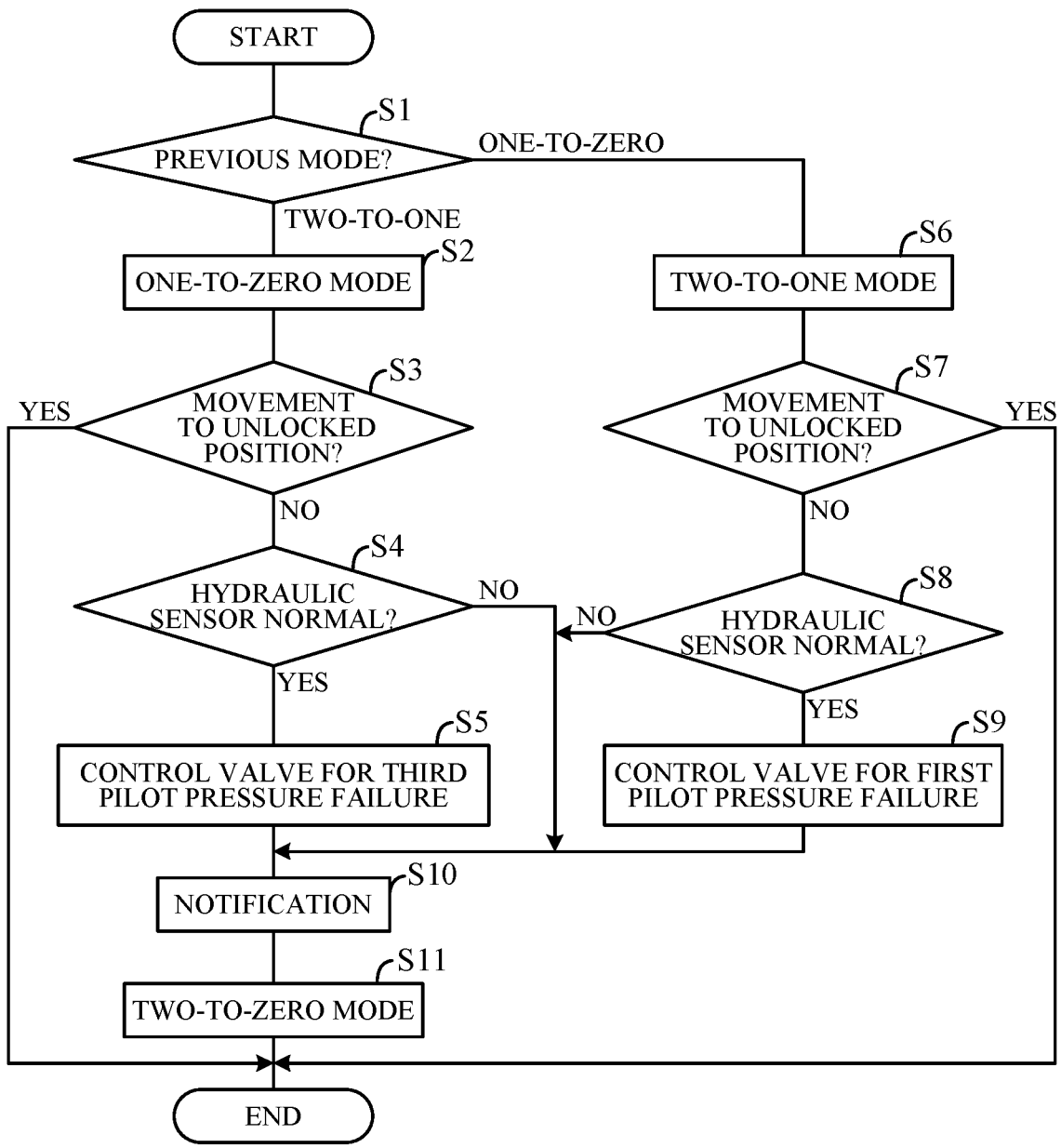
FIG. 8 is a flowchart illustrating an example of process executed by a CPU in FIG. 6.

FIG. 8 is a flow chart illustrating an example of process executed by the ECU 40 (CPU 40a) according to a pre-stored program. The process shown in this flowchart is started when the piston 21 of the switching mechanism 20 is in the locked position and the switching to D range is detected by the shift sensor 44. For example, in a state where R range is instructed and the piston 21 is in the locked position, when the switching from R range to D range is detected by the shift sensor 44, the process is started. In a state where the piston 21 is in the locked position, when the switching from N range to D range or the switching from P range to D range is detected, the process is also started in the same manner. That is, when the switching instruction of the piston 21 from the locked position to the unlocked position is detected, the process in FIG. 8 is started. The process in FIG. 8 is continued until the movement of the piston 21 to the unlocked position is detected.

As shown in FIG. 8, first, in step S1 (S: process step), when the switching from R range to D range has been instructed in the previous process, the CPU 40a determines which of two-to-one mode and one-to-zero mode has been executed. In 51, if it is determined that two-to-one mode has been executed, the process proceeds to S2, and the CPU 40a outputs control signal to the solenoids 24a and 26a to 28a so as to execute the switching of the switching mechanism 20 in one-to-zero mode (FIG. 7B). The switching process of the switching mechanism in one-to-zero mode may be referred to as a one-to-zero switching process. Next, in S3, the CPU 40a determines whether or not the piston 21 has moved to the unlocked position based on signal from the stroke sensor 41. This determination is made after a predetermined time (assumed movement time) has elapsed since the start of the one-to-zero switching process in consideration of the point that it takes time to move the piston 21 to the unlocked position after outputting of control signal to the solenoid.

If a negative decision is made in S3, the process proceeds to S4, and if a positive decision is made, the process ends. In practice, the process does not immediately proceed to S4 if the negative decision is made in S3, but proceeds to S4 if the state of the negative decision is continued for a predetermined time period (for example, 500 msec). In S4, the CPU 40a determines whether or not the hydraulic sensors 42 and 43 output signals in normal state. The process in S4 is affirmed that the action of the predetermined second pilot pressure Pi2 is detected by the hydraulic sensor 42 and the non-action of the fourth pilot pressure Pi4 is detected by the hydraulic sensor 43. If a positive decision is made in S4, the process proceeds to S5, and if a negative decision is made, the process skirts S5 and proceeds to S10. In S5, the CPU 40a determines that the control valve 27 for third pilot pressure is failed.

On the other hand, in 51, if it is determined that one-to-zero mode has been executed in the previous process, the process proceeds to step S6, and the CPU 40a outputs control signal to the solenoids 24a and 26a to 28a so as to execute the switching of the switching mechanism 20 in two-to-one mode (FIG. 7A). The switching process of the switching mechanism 20 in two-to-one mode may be referred to as a two-to-one switching process. Next, in S7, as in S3, the CPU 40a determines whether or not the piston 21 has moved to the unlocked position based on signal from the stroke sensor 41. If a negative decision is made in S7, the process proceeds to S8, and if a positive decision is made, the process ends. In practice, the process does not immediately proceed to S8 if the negative decision is made in S7, but proceeds to S8 if the state of the negative decision in S7 is continued for a predetermined time period (for example, 500 msec). In S8, as in S4, the CPU 40a determines whether or not the hydraulic sensors 42 and 43 output signals in normal state. If a positive decision is made in S8, the process proceeds to S9, and if a negative decision is made, the process skirts S9 and proceeds to S10. In S9, the CPU 40a determines that the control valve 24 for first pilot pressure is failed.

In S10, the CPU 40a outputs control signal to the notification unit 45 so as to notify the driver of the failure information. That is, the CPU 40a outputs control signal so as to notify information on the failure of the control valve 27 detected in S5, the failure of the control valve 24 detected in S9, and the failure of the control valves 25, 26 and 28 detected in S4 and S8. Next, in 511, the CPU 40a outputs control signal to the solenoids 24a and 26a to 28a so as to execute the switching process of the switching mechanism 20 in two-to-zero mode (FIG. 7A). The switching process of the switching mechanism 20 in two-to-zero mode may be referred to as a two-to-zero switching process. As a result, the piston 21 moves to the unlocked position.

Figure 9:
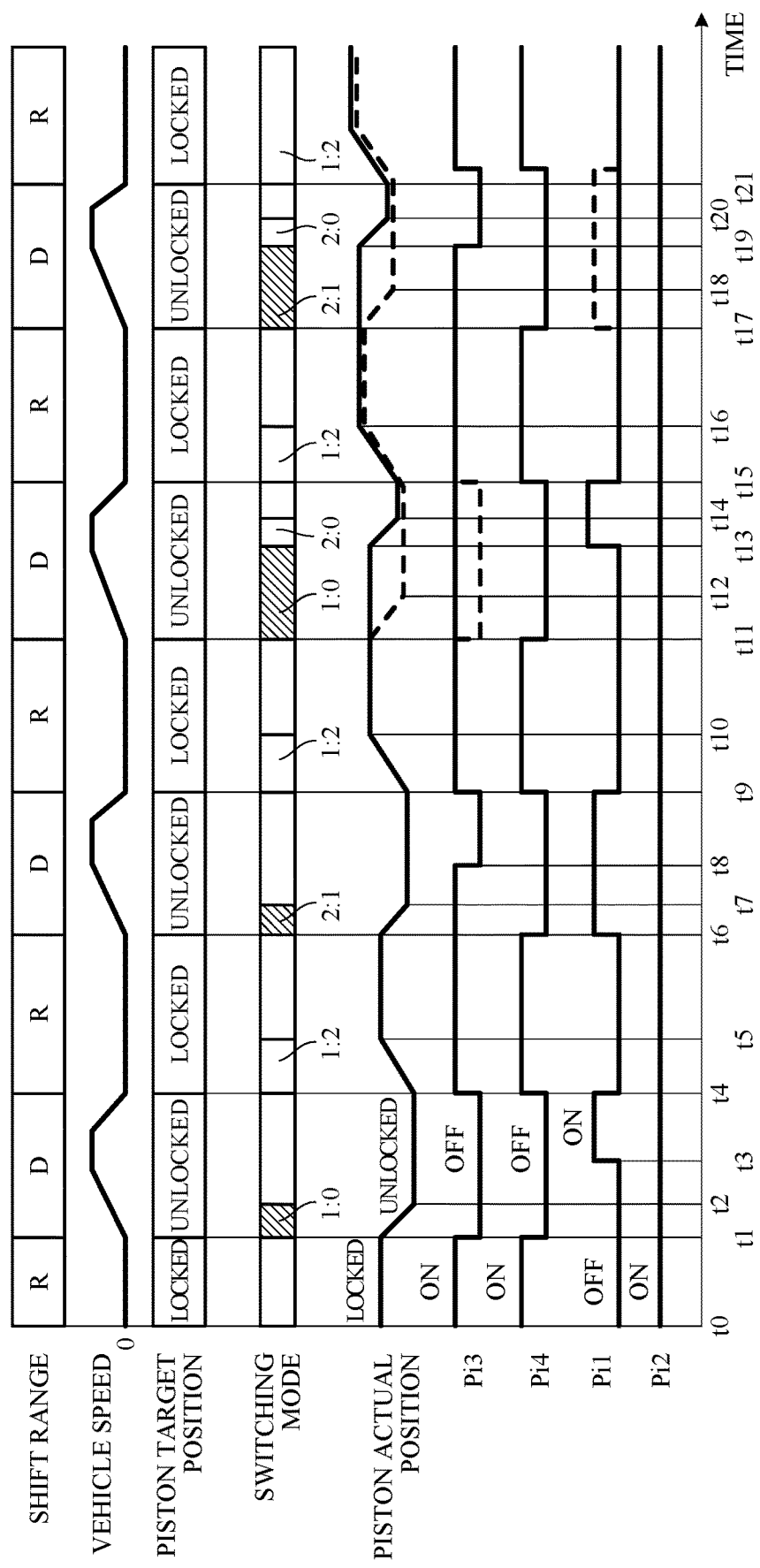
FIG. 9 is a time chart showing an example of operation of the hydraulic control apparatus according to the embodiment of the present invention.

The operation of the hydraulic control apparatus 7 according to the present embodiment will be described in more detail. FIG. 9 is a time chart showing an example of the operation of the hydraulic control apparatus 7. In other words, FIG. 9 is a time chart showing changes in shift range, vehicle speed, target position of the piston 21, switching mode of the switching mechanism 20, actual position of the piston 21, and pilot pressures Pit to Pi4 over time. In FIG. 9, actual positions of the piston 21 are indicated in solid lines, and actual positions (target positions) assumed when the piston 21 moves normally are indicated in dotted lines. Action and non-action of pilot pressure Pi 1 to Pi4 controlled by control signal are indicated by ON and OFF in the solid-line, respectively, and action and non-action of pilot pressure Pi1 to Pi4 due to the failure of the control valves 24 to 28 are indicated by ON and OFF in the dotted-line, respectively. In FIG. 9, pilot pressure Pi2 constantly is turned on. Further, one-to-zero switching process and two-to-one switching process for switching the piston 21 to the unlocked position are indicated by hatching, respectively.

The operation from time t0 to time t10 in FIG. 9 is an operation when all the control valves 24 to 28 are normal. As shown in FIG. 9, at time t0, the shift range is R range. Therefore, the piston 21 is in the locked position, second pilot pressure Pi2, third pilot pressure Pi3 and fourth pilot pressure Pi4 are turned on, and first pilot pressure Pi1 is turned off. When switching to D range is instructed at time t1, one-to-zero switching process is started, and only second pilot pressure Pi2 is turned on (S2). As a result, the piston 21 moves to the unlocked position at time t2. Thereafter, when the speed stage is switched from first speed stage to second speed stage, first pilot-pressure Pi1 is turned on (time t3).

At time t4, when the switching to R range is instructed, one-to-two switching process is started, second pilot pressure Pi2, third pilot pressure Pi3, and fourth pilot pressure Pi4 are turned on, and first pilot pressure Pi1 is turned off. As a result, the piston 21 moves to the locked position at time t5. Thereafter, at time t6, when the switching to D range is instructed, two-to-one switching process is started, first pilot pressure Pi1, second pilot pressure Pi2, and third pilot pressure Pi3 are turned on, and fourth pilot pressure Pi4 is turned off (S6). As a result, the piston 21 moves to the unlocked position at time t7. Thereafter, when the speed stage is switched from first speed stage to second speed stage, third pilot pressure Pi3 is turned off (time t8).

At time t9, when the switching to R range is instructed, one-to-two switching process is started, second pilot pressure Pi2, third pilot pressure Pi3 and fourth pilot pressure Pi4 are turned on, and first pilot pressure Pi1 is turned off. As a result, the piston 21 moves to the locked position at time t10.

After that, when the switching to D range is instructed at time t11, one-to-zero switching process is started (S2). At this time, even though the predetermined time (assumed moving time) has elapsed since the start of one-to-zero switching process, when the switching of the piston 21 to the unlocked position is not detected (time t12), counting of the predetermined time (for example, 500 msec) is started. When the predetermined time elapses (time t13), it is determined that third pilot pressure Pi3 is ON, and a failure of the control valve 27 is detected (S5).

When the failure of the control valve 27 is detected, two-to-zero switching process is started instead of one-to-zero switching process, and first pilot pressure Pi1 is turned on (S11). As a result, the piston 21 moves to the unlocked position at time t14. At time t15, when the switching to R range is instructed, one-to-two switching process is started, second pilot pressure Pi2, third pilot pressure Pi3 and fourth pilot pressure Pi4 are turned on, and first pilot pressure Pi1 is turned off. As a result, the piston 21 moves to the locked position at time t16.

Thereafter, at time t17, when the switching to D range is instructed, two-to-one switching process is started. Note that, after time t17, it is assumed that the control valve 27 for third pilot pressure operates normally. At this time, even though the predetermined time (assumed moving time) has elapsed since two-to-one switching process is started, when the switching of the piston 21 to the unlocked position is not detected (time t18), counting of the predetermined time (for example, 500 msec) is started. When the predetermined time elapses (time t19), it is determined that first pilot pressure Pi1 is OFF, and a failure of the control valve 24 is detected (S9).

When the failure of the control valve 24 is detected, two-to-zero switching process is started instead of two-to-one switching process, and third pilot pressure Pi3 is turned off (S11). As a result, the piston 21 moves to the unlocked position at time t20. At time t21, when the switching to R range is instructed, one-to-two switching process is started, second pilot pressure Pi2, third pilot pressure Pi3, and fourth pilot pressure Pi4 are turned on, and first pilot pressure Pi1 is turned off The present embodiment can achieve advantageous effects as follows:

(1) A hydraulic control apparatus 7 includes: a piston 21 provided so as to be movable between unlocked position and locked position; a plurality of control valves 24 to 28 including the control valves 24 to 26 respectively switched so as to exert hydraulic pressure on the piston 21 to press the piston 21 toward the unlocked position side, and the control valves 27 and 28 respectively switched so as to exert hydraulic pressure on the piston 21 to press the piston 21 toward the locked position side; a hydraulic sensor 42 detecting failure of the control valves 25 and 26; a hydraulic sensor 43 detecting failure of the control valve 28; a stroke sensor 41 detecting movement of the piston 21 from the locked position to the unlocked position; and an ECU 40 including a CPU 40*a* and a memory 40*b* (FIG. 5). The CPU 40*a* performs controlling the control valves 24 to 28, the controlling including executing a process (two-to-one switching process) controlling the control valves 24 to 28 so that hydraulic pressures are exerted on the piston 21 in accordance with switching of the control valves 24 to 27 while action of the hydraulic pressure on the piston 21 stops in accordance with switching of the control valve 28, or a process (one-to-zero switching process) controlling the control valves 24 to 28 so that hydraulic pressures are exerted on the piston 21 in accordance with switching of the control valves 25 and 26 while action of the hydraulic pressure on the piston 21 stops in accordance with switching of the control valves 24, 27 and 28, when the piston 21 is moved from the locked position to the unlocked position (FIG. 8). The CPU 40*a* further performs determining that the control valve 24 is failed when the movement of the piston 21 to the unlocked position is not detected by the stroke sensor 41 in spite of execution of two-to-one switching process, and determining that the control valve 27 is failed when the movement of the piston 21 to the unlocked position is not detected by the stroke sensor 41 in spite of execution of one-to-zero switching process, under a situation where the failures of the control valves 25 and 26 are not detected by the hydraulic sensor 42 and the failure of the control valve 28 is not detected by the hydraulic sensor 43 (FIG. 8).

Accordingly, it is possible to detect the failure of the control valve 24 for first pilot pressure and the failure of the control valve 27 for third pilot pressure without separately providing a hydraulic pressure sensor, a hydraulic switch, or the like. As a result, the configuration of the hydraulic control apparatus 7 can be simplified, and the entire hydraulic control apparatus can be inexpensively configured. In other words, among the plurality of control valves 24 to 28 for driving the piston 21, in order to identify which control valves 24 to 28 are failed, it is not require to provide a sensor more than necessary, and thus can be configured inexpensively. In addition, since it is possible to specify which of the plurality of control valves 24 to 28 for switching the switching mechanism 20 is faulty, it is easy to repair the hydraulic control apparatus 7. Further, it is possible to improve safety and contribute to a sustainable transportation system. (2) The piston 21 is configured to switch shift range of the transmission 3 from R range to D range in accordance with the switching from the locked position to the unlocked position (FIG. 8). The CPU 40*a* executes two-to-one switching process or one-to-zero switching process every time switching shift range of the transmission 3 from R range to D range is instructed (FIG. 8). Thus, by executing the failure determination process of the control valves 24 to 28 in accordance with the switching instruction of the shift range, it is possible to prevent the driver from feeling uncomfortable during traveling.

(3) The transmission 3 has an input shaft 3*a* and an output shaft 3*b* (FIG. 2). The CPU 40*a* can also be configured to perform two-to-one switching process or one-to-zero switching process every time switching shift range of the transmission 3 from N range or P range to D range is instructed with the piston 21 in the locked position. In this case as well, it is possible to prevent the driver from feeling uncomfortable during traveling.

(4) When the control valves 24 and 27 are determined to be faulty, the CPU 40a further executes a process of notifying the failure information (FIG. 8). As a result, the driver can easily recognize the presence or absence of the failure in the control valves 24 and 27, and can quickly arrange for repair of the hydraulic control apparatus 7 after identifying the failure location.

(5) The CPU 40a alternately executes two-to-one switching process and one-to-zero switching process each time the piston 21 is moved from the locked position to the unlocked position (FIG. 8). Accordingly, it is possible to quickly detect the failure of the control valve 24 and the failure of the control valve 27.

(6) When the control valve 27 is determined to be failed through one-to-zero switching process, the CPU 40a controls the control valves 24 to 28 such that hydraulic pressure is exerted on the piston 21 in accordance with switching of the control valves 24 to 26 while action of hydraulic pressure on the piston 21 stops in accordance with switching of the control valves 27 and 28 (FIG. 8). That is, the CPU 40a executes two-to-zero switching process. Thus, even when the control valve 27 is failed, the piston 21 can be moved to the unlocked position and the two-way clutch TWC can be switched to the unlocked state.

(7) When it is determined that the control valve 24 is failed through two-to-one switching process, the CPU 40a controls the control valves 24 to 28 such that hydraulic pressure is exerted on the piston 21 in accordance with switching of the control valves 24 to 26 while action of hydraulic pressure on the piston 21 stops in accordance with switching of the control valves 27 and 28 (FIG. 8). That is, the CPU 40a executes two-to-zero switching process. Thus, even when the control valve 24 is failed, the piston 21 can be moved to the unlocked position and the two-way clutch TWC can be switched to the unlocked state.

(8) The CPU 40a controls the control valves 24 to 28 such that when the piston 21 is moved from the unlocked position to the locked position, hydraulic pressure is exerted on the piston 21 in accordance with switching of the control valves 25 to 28 while action of the hydraulic pressure on the piston 21 stops in accordance with switching of the control valve 24. Accordingly, when switching from D range to R range is instructed, the piston 21 can be moved to the locked position and the two-way clutch TWC can be switched to the locked state.

The above embodiment can be modified to various forms. Several modifications will be described below. In the above embodiment, the piston 21 is provided so as to be movable between the lock position (second position) and the unlock position (first position), the piston 21 is moved to the first position by hydraulic pressure acting on the oil chambers 22a and 22b, and the piston 21 is moved to the second position by hydraulic pressure acting on the oil chambers 23a and 23b, but the configuration of the piston is not limited to the above-described one. In the above embodiment, each time the switching from R range to D range is instructed, two-to-one switching process and one-to-zero switching process are alternately executed to detect the failure of the control valves 24 to 28. However, the present invention can be similarly applied to other switching mechanism having a plurality of oil chambers in which hydraulic pressures act on one end side and the other end side of the piston. For example, the present invention can also be applied to the parking mechanism 37 in FIG. 2.

Figure 10:
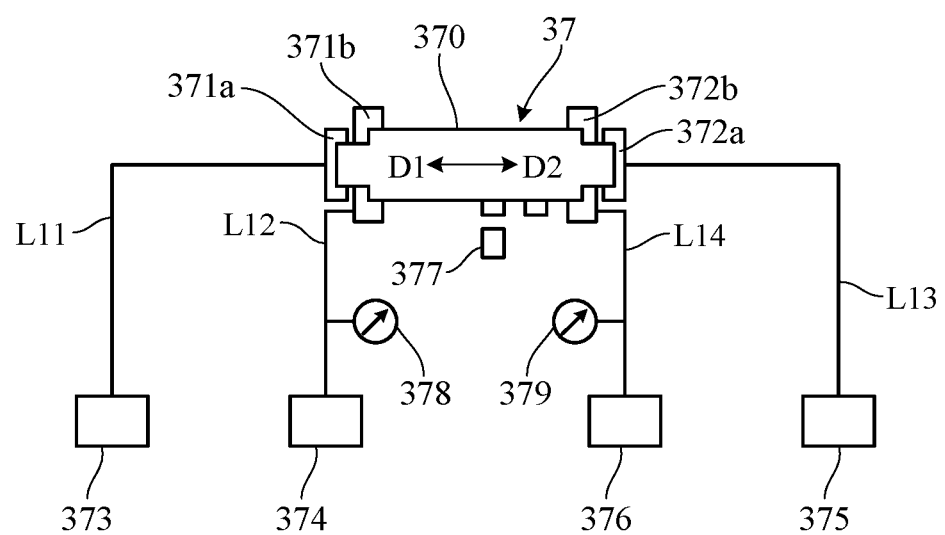
FIG. 10 is a diagram showing another example of the hydraulic circuit to which the hydraulic control apparatus according to the embodiment of the present invention is applied, and particularly shows a configuration of the hydraulic circuit around a parking mechanism.

FIG. 10 is a diagram illustrating a configuration of a hydraulic circuit around the parking mechanism 37. As shown in FIG. 10, the parking mechanism 37 has a piston 370 that moves in the direction of arrow D1 and the direction of arrow D2 by hydraulic pressure. When the piston 370 moves in the direction of arrow D1, that is, when it moves to the locked position (the second position), the parking pole 35 swings in the direction of arrow R1 in FIG. 1, and the parking lock operation state is established. When the piston 370 moves in the direction of arrow D2, that is, when it moves to the unlocked position (the first position), the parking pole 35 swings in the direction of arrow R2 in FIG. 1, and the parking lock release state is established.

Oil chambers 371a and 371b are provided on one end side of the piston 370, and oil chambers 372a and 372b are provided on the other end side. A control valve 373 is connected to the oil chamber 371a via an oil passage L11, a control valve 374 is connected to the oil chamber 371b via an oil passage L12, a control valve 375 is connected to the oil chamber 372a via an oil passage L13, and a control valve 376 is connected to the oil chamber 372b via an oil passage L14. The control valves 373 to 376 are solenoid valves that are configured to be switched by control signal from the ECU 40, or hydraulic valves that are switched by switching of solenoid valves.

Whether the piston 370 is in the locked position or the unlocked position is detected by a stroke sensor 377. A hydraulic sensor 378 is connected to the oil passage L12, and the hydraulic sensor 378 detects whether or not hydraulic pressure normally acts on the oil passage L12, that is, a failure of the control valve 374. A hydraulic sensor 379 is connected to the oil passage L14, and by the hydraulic sensor 379, whether or not hydraulic pressure normally acts on the oil passage L14, that is, a failure of the control valve 376 is detected.

In such a configuration, when switching from P range to another range (for example, D range) is instructed by the shift sensor 44, the CPU 40a controls the control valves 373 to 376 so that hydraulic pressure is exerted on the oil chamber 371a, 371b and 372a while hydraulic pressure is not exerted on the oil chamber 372b. That is, two-to-one switching process is executed. When the movement of the piston 370 to the unlocked position is not detected by the stroke sensor 377 despite the execution of two-to-one switching process, the CPU 40a detects a failure of the control valve 373.

The CPU 40a controls the control valves 373 to 376 so that when switching from P range to D range is instructed again by the shift sensor 44 after two-to-one switching process is executed, hydraulic pressure is applied to the oil chamber 371a and hydraulic pressures are not applied to the oil chambers 371b, 372a and 372b. That is, one-to-zero switching process is executed. When the movement of the piston 370 to the unlocked position is not detected by the stroke sensor 377 despite the execution of one-to-zero switching process, the CPU 40a detects a failure of the control valve 375.

In the above embodiment, the first pilot pressure Pi1 (a first hydraulic pressure) and the second pilot pressure Pi2 (a second hydraulic pressure) that press the piston 21 toward the unlocked position side via the control valve 24 (a first control valve) and the control valves 25 and 26 (a second control valve) are applied, and the third pilot pressure Pi3 (a third hydraulic pressure) and the fourth pilot pressure Pi4 (a fourth hydraulic pressure) that press the piston 21 toward the locked position side via the control valve 27 (a third control valve) and the control valve 28 (a fourth control valve) are applied. However, the configurations of the first control valve to the fourth control valve are not limited to those described above. That is, the first control valve to the fourth control valve may be either a solenoid valve or a linear solenoid, or may be a hydraulic valve that is switched by the operation of the solenoid valve or the linear solenoid valve.

In the above embodiment, each time shift range is switched from R range (reverse range; a first range) to D range (drive range; a second range), the CPU 40a alternately executes two-to-one switching process (a first process) and one-to-zero switching process (a second process). However, the CPU may be executed only one of them. The first range may be D range, the second range may be R range, and each time shift range is switched from the first range to the second range, two-to-one switching process or one-to-zero switching process may be executed. In the above embodiment, when shift range is switched from N range (a neutral range) or P range (a parking range) to D range in a state where the piston 21 is in the locked position, two-to-one switching process or one-to-zero switching process is executed, thus either one of the first range and the second range may be N range or P range.

Although in the above embodiment, the failures of the control valves 25 and 26 are detected by the hydraulic sensor 42, the configuration of a first failure detection device is not limited to the above configuration. Although in the above embodiment, the failure of the control valve 28 is detected by the hydraulic sensor 43, the configuration of a second failure detection device is not limited to the above configuration. Although in the above embodiment, the movement of the piston 21 from the locked position to the unlocked position is detected by the stroke sensor 41, the configuration of a movement detection device is not limited to the above configuration. In the above embodiment, when the control valves 24 to 28 are determined to be faulty, the CPU 40a outputs control signal to the notification unit 45 to notify the failure information. However, it is not necessary to notify the failure information of all the control valves 24 to 28 as long as the failure information of at least the control valve 24 or 27 is notified.

The present invention can also be used as a hydraulic control method controlling a hydraulic device, the hydraulic device including a piston provided so as to be movable between a first position and a second position, and a plurality of control valves including a first control valve, a second control valve, a third control valve and a fourth control valve, the first control valve and the second control valve being respectively switched so as to exert a first hydraulic pressure and a second hydraulic pressure on the piston to press the piston toward the first position, the third control valve and the fourth control valve being respectively switched so as to exert a third hydraulic pressure and a fourth hydraulic pressure on the piston to press the piston toward the second position. The hydraulic control method includes: detecting a failure of the second control valve; detecting a failure of the fourth control valve; detecting a movement of the piston from the second position to the first position; executing a first process controlling the plurality of control valves so that the first hydraulic pressure, the second hydraulic pressure and the third hydraulic pressure are exerted on the piston while the fourth hydraulic pressure is not exerted, or a second process controlling the plurality of control valves so that the second hydraulic pressure is exerted on the piston while the first hydraulic pressure, the third hydraulic pressure and the fourth hydraulic pressure are not exerted, when the piston is moved from the second position to the first position; and determining that the first control valve is failed when the movement of the piston to the first position is not detected in spite of an execution of the first process, and determining that the third control valve is failed when the movement of the piston to the first position is not detected in spite of an execution of the second process, under a situation where the failure of the second control valve is not detected and the failure of the fourth control valve is not detected.

The above embodiment can be combined as desired with one or more of the above modifications. The modifications can also be combined with one another.

According to the present invention, it is possible to identify which of a plurality of control valves for driving a piston is failed with an inexpensive configuration.

Above, while the present invention has been described with reference to the preferred embodiments thereof, it will be understood, by those skilled in the art, that various changes and modifications may be made thereto without departing from the scope of the appended claims.

What is claimed is:

1. A hydraulic control apparatus comprising:
a piston provided so as to be movable between a first position and a second position;
a plurality of control valves including a first control valve, a second control valve, a third control valve and a fourth control valve, the first control valve and the second control valve being respectively switched so as to exert a first hydraulic pressure and a second hydraulic pressure on the piston to press the piston toward the first position, the third control valve and the fourth control valve being respectively switched so as to exert a third hydraulic pressure and a fourth hydraulic pressure on the piston to press the piston toward the second position;
a first failure detection device that detects a failure of the second control valve;
a second failure detection device that detects a failure of the fourth control valve;
a movement detection device that detects a movement of the piston from the second position to the first position; and
an electronic control unit including a microprocessor and a memory connected to the microprocessor, wherein
the microprocessor is configured to perform
controlling the plurality of control valves,
the controlling including executing a first process controlling the plurality of control valves so that the first hydraulic pressure, the second hydraulic pressure and the third hydraulic pressure are exerted on the piston while the fourth hydraulic pressure is not exerted, or a second process controlling the plurality of control valves so that the second hydraulic pressure is exerted on the piston while the first hydraulic pressure, the third hydraulic pressure and the fourth hydraulic pressure are not exerted, when the piston is moved from the second position to the first position, and
the microprocessor is further configured to perform
determining that the first control valve is failed when the movement of the piston to the first position is not detected by the movement detection device in spite of an execution of the first process, and determining that the third control valve is failed when the movement of the piston to the first position is not detected by the movement detection device in spite of an execution of the second process, under a situation where the failure of the second control valve is not detected by the first failure detection device and the failure of the fourth control valve is not detected by the second failure detection device.

2. The hydraulic control apparatus according to claim 1, wherein
the piston is configured to switch a shift range of a transmission from a first range to a second range in accordance with the movement of the piston from the second position to the first position,
the microprocessor is configured to further perform instructing to switch the shift range of the transmission from the first range to the second range, and
the microprocessor is configured to perform the controlling including executing the first process or the second process every time a switching of the shift range from the first range to the second range is instructed.

3. The hydraulic control apparatus according to claim 1, wherein
the piston is configured to switch a shift range of a transmission from a first range to a second range in accordance with the movement of the piston from the second position to the first position,
the first range is one of a drive range for a forward travel and a reverse range for a reverse travel,
the second range is another of the drive range and the reverse range,
the microprocessor is configured to further perform instructing to switch the shift range of the transmission from the first range to the second range, and
the microprocessor is configured to perform the controlling including executing the first process or the second process every time a switching of the shift range from the first range to the second range is instructed.

4. The hydraulic control apparatus according to claim 1, wherein
the piston is configured to switch a shift range of a transmission from a first range to a second range in accordance with the movement of the piston from the second position to the first position,
the transmission includes an input shaft and an output shaft,
the first range is a neutral range shutting off a power transmission from the input shaft to the output shaft or a parking range preventing the output shaft from rotating,
the second range is a drive range for a forward travel,
the microprocessor is configured to further perform instructing to switch the shift range of the transmission from the first range to the second range, and
the microprocessor is configured to perform the controlling including executing the first process or the second process every time a switching of the shift range from the first range to the second range is instructed.

5. The hydraulic control apparatus according to claim 1, wherein
the microprocessor is configured to further perform notifying failure information when it is determined that the first control valve or the third control valve is failed.

6. The hydraulic control apparatus according to claim 1, wherein
the microprocessor is configured to perform
the controlling including alternately executing the first process and the second process every time the piston is moved from the second position to the first position.

7. The hydraulic control apparatus according to claim 1, wherein
the microprocessor is configured to perform
the controlling including controlling the plurality of control valves so that the first hydraulic pressure and the second hydraulic pressure are exerted on the piston while the third hydraulic pressure and the fourth hydraulic pressure are not exerted when it is determined that the third control valve is failed through the second process.

8. The hydraulic control apparatus according to claim 1, wherein
the microprocessor is configured to perform
the controlling including controlling the plurality of control valves so that the first hydraulic pressure and the second hydraulic pressure are exerted on the piston while the third hydraulic pressure and the fourth hydraulic pressure are not exerted when it is determined that the first control valve is failed through the first process.

9. The hydraulic control apparatus according to claim 1, wherein
the microprocessor is configured to perform
the controlling including controlling the plurality of control valves so that the second hydraulic pressure, the third hydraulic pressure and the fourth hydraulic pressure are exerted on the piston while the first hydraulic pressure is not exerted, when the piston is moved from the first position to the second position.

10. A hydraulic control method controlling a hydraulic device, the hydraulic device including a piston provided so as to be movable between a first position and a second position, and a plurality of control valves including a first control valve, a second control valve, a third control valve and a fourth control valve, the first control valve and the second control valve being respectively switched so as to exert a first hydraulic pressure and a second hydraulic pressure on the piston to press the piston toward the first position, the third control valve and the fourth control valve being respectively switched so as to exert a third hydraulic pressure and a fourth hydraulic pressure on the piston to press the piston toward the second position,
the hydraulic control method comprising:
detecting a failure of the second control valve;
detecting a failure of the fourth control valve;
detecting a movement of the piston from the second position to the first position;
executing a first process controlling the plurality of control valves so that the first hydraulic pressure, the second hydraulic pressure and the third hydraulic pressure are exerted on the piston while the fourth hydraulic pressure is not exerted, or a second process controlling the plurality of control valves so that the second hydraulic pressure is exerted on the piston while the first hydraulic pressure, the third hydraulic pressure and the fourth hydraulic pressure are not exerted, when the piston is moved from the second position to the first position; and
determining that the first control valve is failed when the movement of the piston to the first position is not detected in spite of an execution of the first process, and determining that the third control valve is failed when the movement of the piston to the first position is not detected in spite of an execution of the second process, under a situation where the failure of the second control valve is not detected and the failure of the fourth control valve is not detected.

* * * * *